US006865151B1

United States Patent
Saunders

(10) Patent No.: US 6,865,151 B1
(45) Date of Patent: Mar. 8, 2005

(54) METHODS AND SYSTEMS FOR OPTIMIZING DATA TRANSMISSION IN NETWORKS

(75) Inventor: Ross Alexander Saunders, Cummings, GA (US)

(73) Assignee: Nortel Networks Limited (CA)

( * ) Notice: Subject to any disclaimer, the term of this patent is extended or adjusted under 35 U.S.C. 154(b) by 798 days.

(21) Appl. No.: 09/604,770

(22) Filed: Jun. 28, 2000

(51) Int. Cl.$^7$ .............................................. H04L 12/28
(52) U.S. Cl. ...................... 370/230; 370/235; 370/252; 370/400
(58) Field of Search ................................ 370/230, 231, 370/23, 232, 235, 235.1, 238, 252, 253

(56) References Cited

U.S. PATENT DOCUMENTS

| | | | | |
|---|---|---|---|---|
| 3,889,065 A | * | 6/1975 | Alsup ........................ | 370/479 |
| 4,649,536 A | * | 3/1987 | Krinock ..................... | 370/470 |
| 5,291,486 A | * | 3/1994 | Koyanagi ................... | 370/541 |
| 5,453,981 A | * | 9/1995 | Katsube et al. ............ | 370/397 |
| 5,663,962 A | * | 9/1997 | Caire et al. ................ | 370/535 |

OTHER PUBLICATIONS

"High–Speed Networks: TCP/IP and ATM Design Principles" By William Stallings, Chapter 8, pp. 181–207.
"CW Mode–Locked, 130 GHz Repetition Rate Soliton Laser Based on Modulational Instability" by P. Franco, F. Fontana, I Cristiani, M. Midrio and M. Romagnoli, in Optical Amplifiers and their Application, Jun. 15–17, 1995, vol. 8, pp 271–273.

* cited by examiner

*Primary Examiner*—Steven Nguyen
*Assistant Examiner*—Roberta A Stevens
(74) *Attorney, Agent, or Firm*—Finnegan, Henderson, Farabow, Garrett & Dunner, L.L.P.

(57) ABSTRACT

An embodiment includes an admission control program of a router in a transmission system. A router includes a dither signal (a periodic timing signal) at a frequency causing the IP flow to organize into a periodic and deterministic pattern. The frequency is selected to maximize IP flow rate. Multiple, independent input paths may be combined into a single output path using the dither signal to regulate when the paths are alternately combined into the single output path.

28 Claims, 9 Drawing Sheets

METHODS AND SYSTEMS FOR OPTIMIZING DATA TRANSMISSION IN NETWORKS

BACKGROUND OF THE INVENTION

A. Field of the Invention

The present invention relates generally to data transmission in networks, and more particularly to systems for optimizing IP data traffic flows within network routers using a periodic dither signal to regulate the flow.

B. Description of the Related Art

Many IP or packetized network traffic models are currently based on well-established queuing models for predicting traffic loads on voice telephony networks. The fundamental reason why traffic aggregation is well understood on voice networks is that callers are refused admittance to the network once a link is saturated. In this manner, the network behaves according to stochastic Poisson statistics. The end-to-end network flows act uncorrelated and independent causing the peak to average load ratio to decrease as the number of users on the network increases. In other words, the peak to average load ratio 100 of voice calls decreases as the number of voice calls increases, as expected from white noise statistics. This phenomenon is shown in FIG. 1.

On the Internet, however, the number of users or computers that can access the network at any given time is not limited. In the event of congestion, all of the computers reduce the transmission rate of data until the congestion clears. This reduction of the flow rate due to saturation of the network results in waves of data that are known to be fractal or self-similar in nature. Self-similar means that traffic on Internet networks exhibits the same characteristics regardless of the number of simultaneous sessions on a given link. In other words, the peak to average load ratio of the traffic does not reduce to the level expected from purely Poisson statistics as the number of shared users in the medium increases. This is because there is correlation of the end-to-end flows as the number of shared users increases. FIG. 2 illustrates an example of the fractal nature of a standard IP flow 200 over time.

Referring now to FIG. 2, as a consequence of the fractal nature of the Internet, higher capacity data pipes must be built to handle peak bursts 202 in the traffic patterns. However, providing extra bandwidth to compensate for occasional peaks in the traffic patterns is inefficient and expensive.

One possible solution for improving IP flow and bandwidth efficiency of a congested IP network is to add Constant Bit Rate (CBR) services, such as voice traffic, to the network. FIG. 2 illustrates the standard IP flow 200 and an IP flow with CBR services added 250. As shown in FIG. 2, the peak to average load ratio of flow 250 decreases from that of IP networks without CBR services. This is counterintuitive because there is less total bandwidth available for the other IP traffic sharing the transmission medium. However, the IP network is basically a nonlinear, dynamic system with positive feedback. The addition of the CBR services reduces the feedback gain on the IP traffic flow, thereby reducing the peak traffic burstiness enough to increase the total IP packet flow. Although the addition of CBR services increases total IP flow, bandwidth utilization is still inefficient and undesirably costly. Therefore, what is needed in the art is a way to further improve bandwidth efficiency and IP flow in a data communications network.

SUMMARY OF THE INVENTION

In accordance with the invention as embodied and broadly described herein, in one aspect, a method is described for transmitting data between a first router and a second router within a network. In general, the method begins by selecting a frequency for a dither signal that maximizes a flow rate of the network. The selected frequency is then used to switch between two sources of the data within the first router to transmit the data to the second router from the first router. Next, an arrival time that the data will arrive at the second router is determined and the second router is placed in an open state before the arrival time. There are a variety of routers, such as a packet router, that may be used in accordance with an embodiment of the present invention.

Additionally, the method may also include selecting the frequency for a dither signal that maximizes the flow rate by varying a dither time as a function of the flow rate and determining the frequency that maximizes the flow rate as the selected frequency. Alternatively, the frequency may be determined by finding the autocorrelation of the flow rate and determining the frequency that minimizes the autocorrelation as the selected frequency. Further, arrival time may be determined by determining a distance between the first router and the second router, determining a time required for the data to travel between the first router and the second router and determining an arrival time based on the time required.

In another respect, a method is described for transmitting data through a routing element of a network. In general, the method begins by generating a periodic dither signal to regulate the transmission of data through the routing element. In response to the periodic dither signal, it then alternatively transmits from a first source of data and from a second source of data. The first source of data and the second source of data may have different input paths to the routing element. Additionally, the first source of data and the second source of data may comprise different groups of data that exhibit a low correlation characteristic to each other. Alternatively, the first source of data and the second source of data comprise different groups of data that are independent and uncorrelated to each other.

In yet another aspect, an apparatus is described for transmitting data within a network. The apparatus includes a dither signal generator for generating a timing signal for alternating between a plurality of data sources at a frequency selected for maximizing a flow rate of data transmission and an admission control device for transmitting the data from the data sources in response to the timing signal. The timing signal may be periodic. The admission control device may be capable of transmitting the data that further comprises a first packet from one of the data sources and a second, uncorrelated packet from another of the data sources, the second packet being transmitted over the same path as the first packet and being offset in time from the first packet.

The apparatus may also include a distance measuring device for determining a distance the data must travel and an arrival time of the packet based on the distance. The distance measuring device may be a location positioning receiver.

In yet another aspect, a computer-readable medium is describe for containing computer-executable instructions for transmitting data between routers within a network. The instructions include generating a periodic dither signal to regulate the transmission of data through the routing element and alternatively transmitting from a first source of data and from a second source of data in response to the periodic dither signal. The first source of data and the second source of data may have different input paths to the routing element. Additionally, the first source of data and the second source of data may comprise different groups of data that exhibit a low correlation characteristic to each other. Alternatively, the first source of data and the second source of data may comprise different groups of data that are independent and uncorrelated to each other.

BRIEF DESCRIPTION OF THE DRAWINGS

The accompanying drawings, which are incorporated in and constitute a part of this specification, illustrate embodiments of the invention and, together with the description, explain the advantages and principles of the invention. In the drawings.

DETAILED DESCRIPTION

Figure 1:
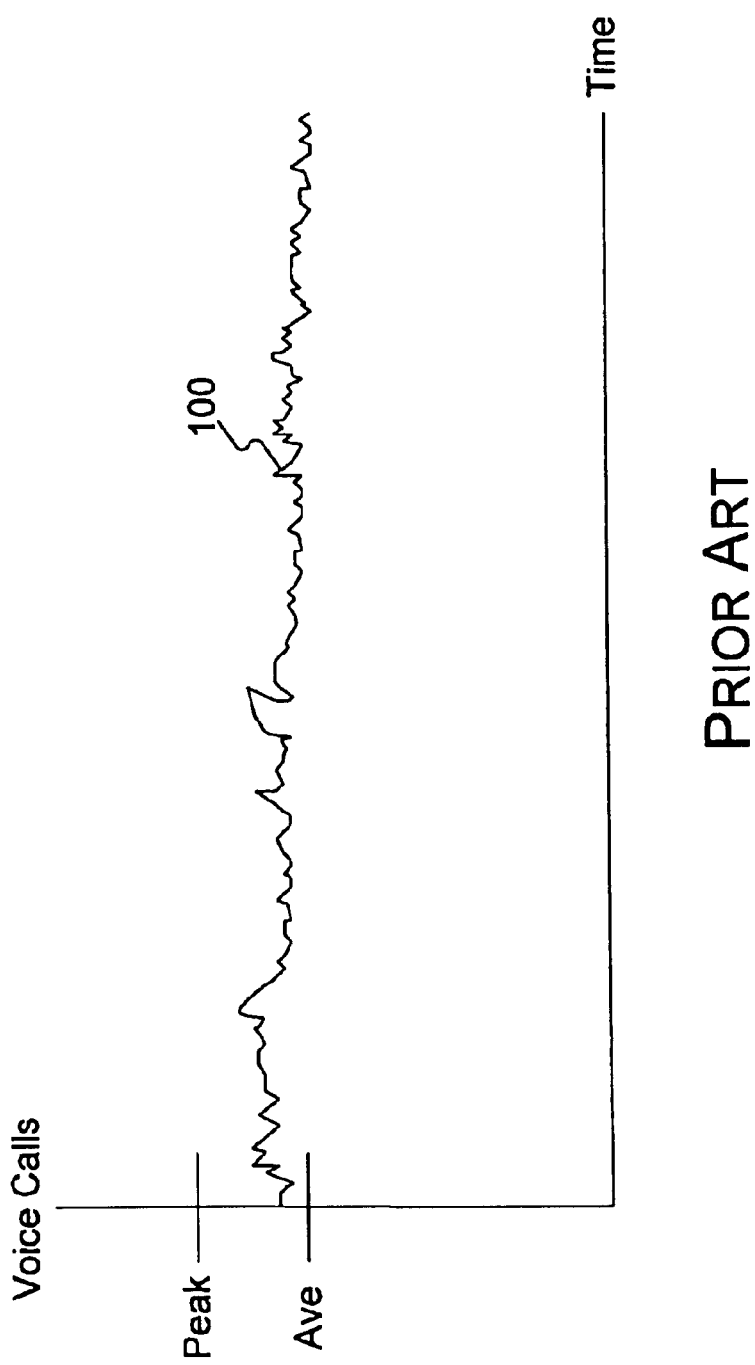
FIG. 1 is a graph of the peak to average load as a function of time in a prior art voice network.

Reference will now be made to various embodiments according to this invention, examples of which are shown in the accompanying drawings and will be apparent from the description of the invention. In the drawings, same reference numbers represent the same or similar elements in the different drawings whenever possible.

It is known that the nonlinear dynamics of an optical fiber may be used to generate pulses. For example, the article "CW Mode-Locked, 130 GHz Repetition Rate Soliton Laser Based on Modulational Instability" by P. Franco et al, published by Optical Amplifiers and Their Applications in June 1995, discloses that a fiber exhibiting a modulation instability could be fed with a small probe signal that is AM or PM modulated. The instability of the fiber could use this small pertabation to generate soliton pulses. Applicant has discovered that a router consistent with an embodiment of the present invention is configured to utilize the nonlinear dynamics of an IP network and improve network flow. Specifically, an embodiment of the present invention improves the admission control process on an IP router to feed the system with a periodic signal to force the IP flow into a deterministic, periodic, predictable pattern. The dither signal is a periodic timing signal produced at a frequency that maximizes IP flow. Because the flow is predictable, the router can determine the distance an IP packet (more generally referred to as data) will travel and the time it will arrive. The router is desirably configured to be in an open state when the packet arrives at the predetermined time to quickly pass the IP packet through the router and onto the next path. Thus, the method improves the flow rate and decreases latency of the network.

Multiple flows could be arranged in a tandem configuration, so that each flow between the source and destination router has a separate path. Using the dither signal to gate the flows, the flow rate of the network would increase. However, the flow rate may be improved further by using the idle bandwidth during the transmission of a first IP flow to transmit a second, uncorrelated IP flow over the same medium. The second transmission is offset in time from the first flow, typically 180° out of phase from the periodic gating of first flow. Embodiments of the present invention may be implemented solely by the addition of software to the admission control program of the router. Therefore, the invention provides a cost-effective way to increase IP flow rate and improve bandwidth utilization.

Figure 2:
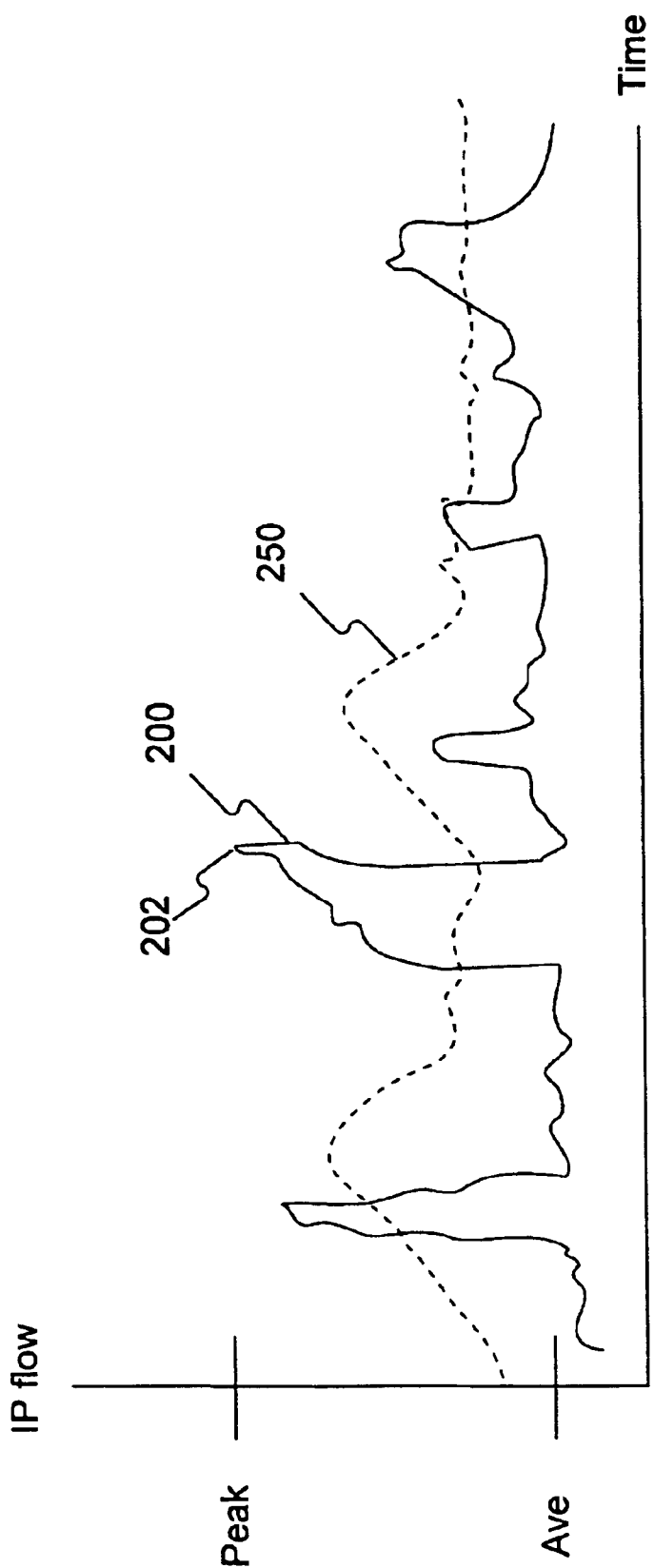
FIG. 2 is a graph of standard IP flow and IP flow with CBR services added as a function of time in a prior art network.
Figure 3:
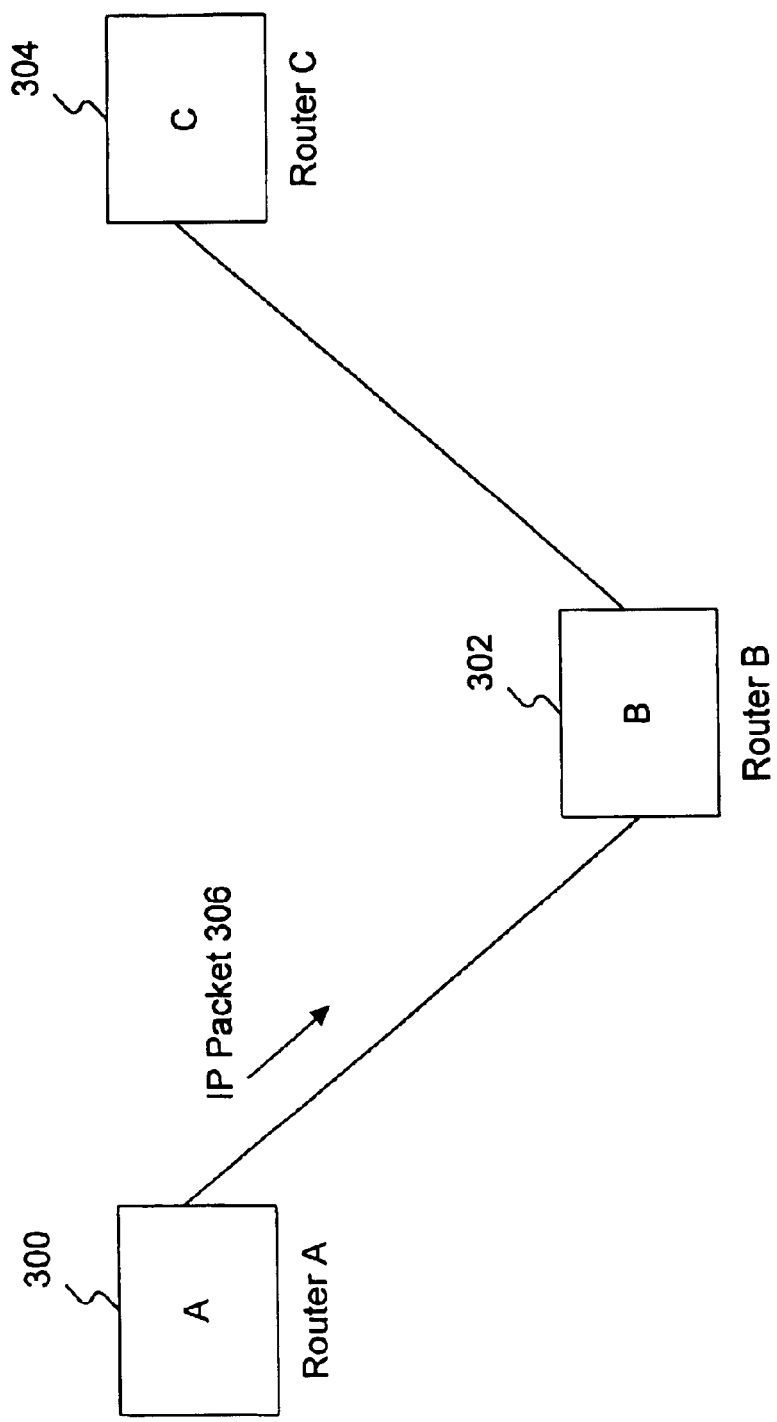
FIG. 3 is a block diagram illustrating a network comprising routers A, B and C consistent with an exemplary embodiment of the present invention.
Figure 4:
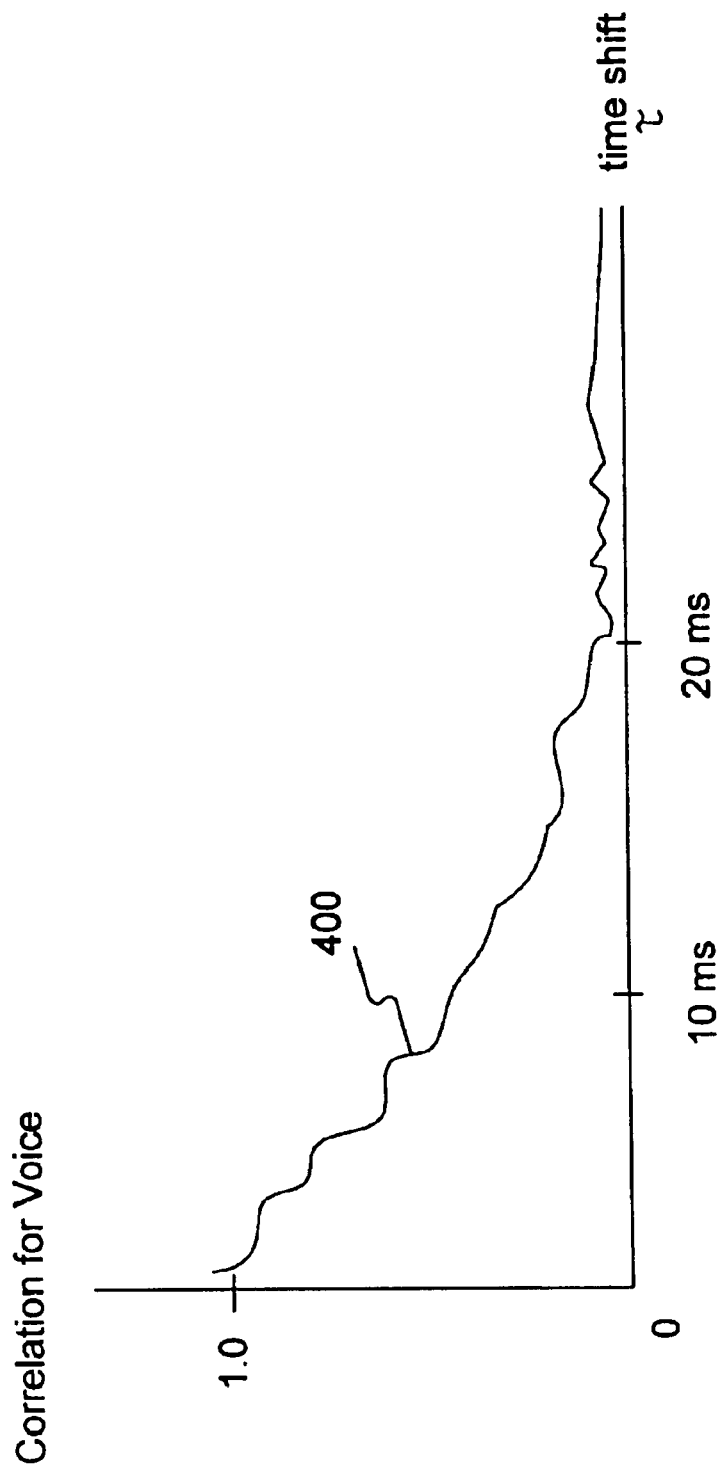
FIG. 4 is a graph of the autocorrelation of voice traffic as a function of time in a prior art network.
Figure 5:
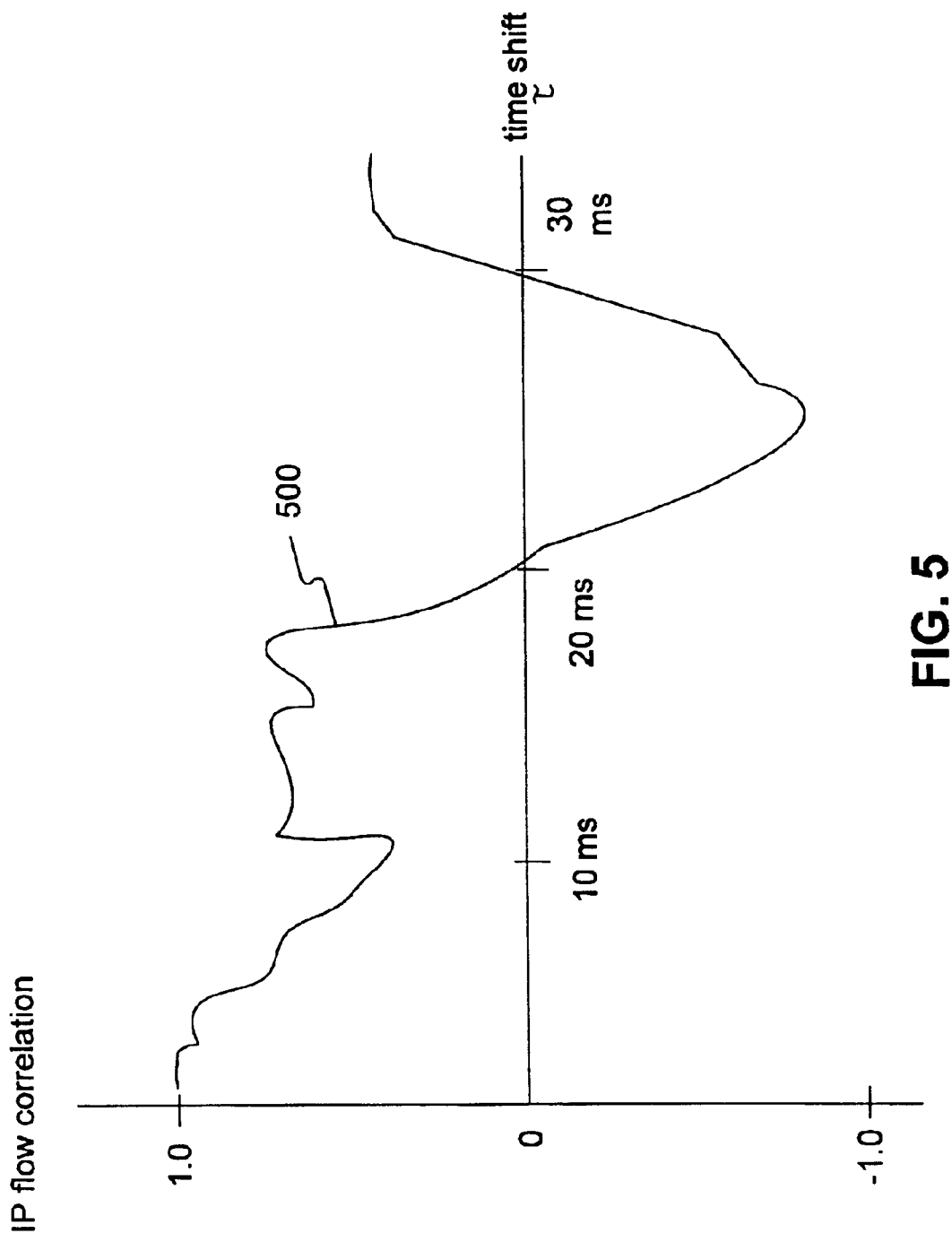
FIG. 5 is a graph of the autocorrelation of the IP flow as a function of time, which is consistent with an exemplary embodiment of the present invention.
Figure 6:
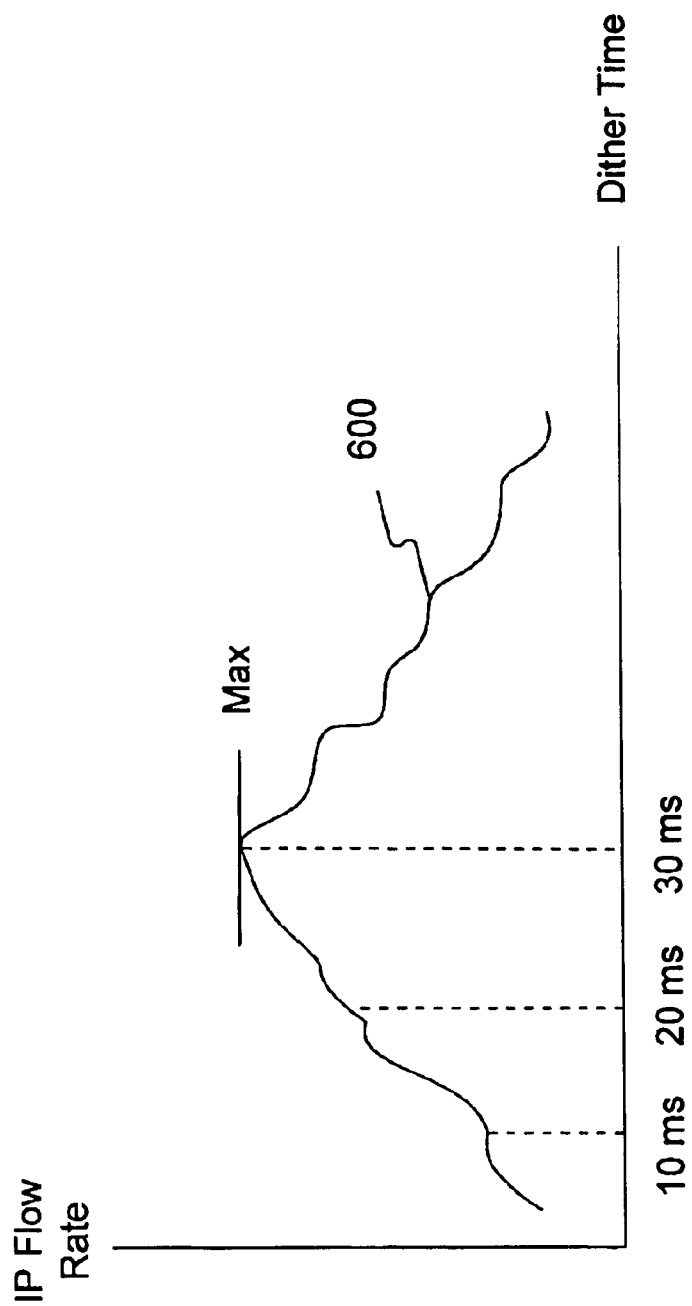
FIG. 6 is a graph of dither time as a function of time consistent with an exemplary embodiment of the present invention.
Figure 7:
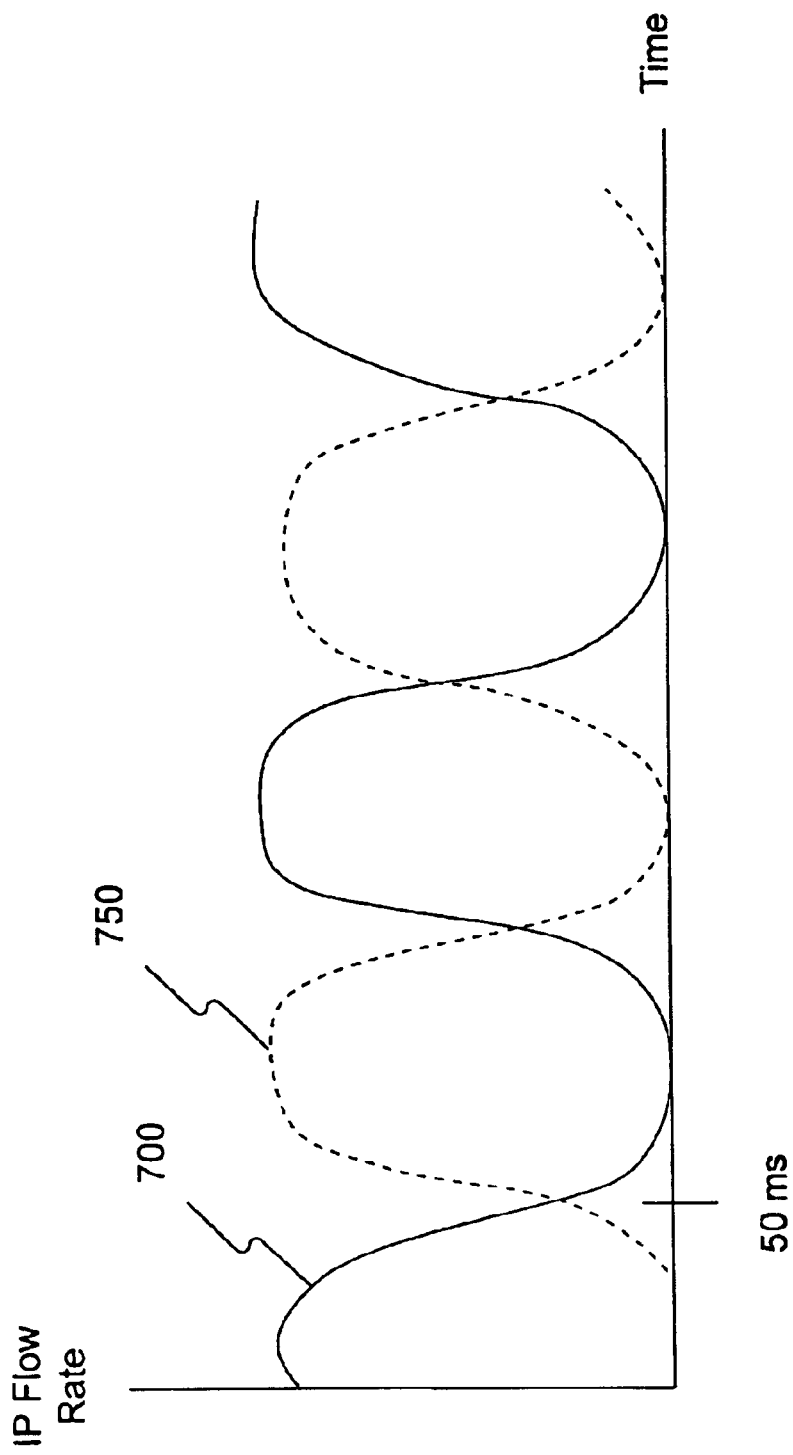
FIG. 7 is a graph of two uncorrelated IP flows being transmitted over a single medium consistent with an exemplary embodiment of the present invention.
Figure 8:
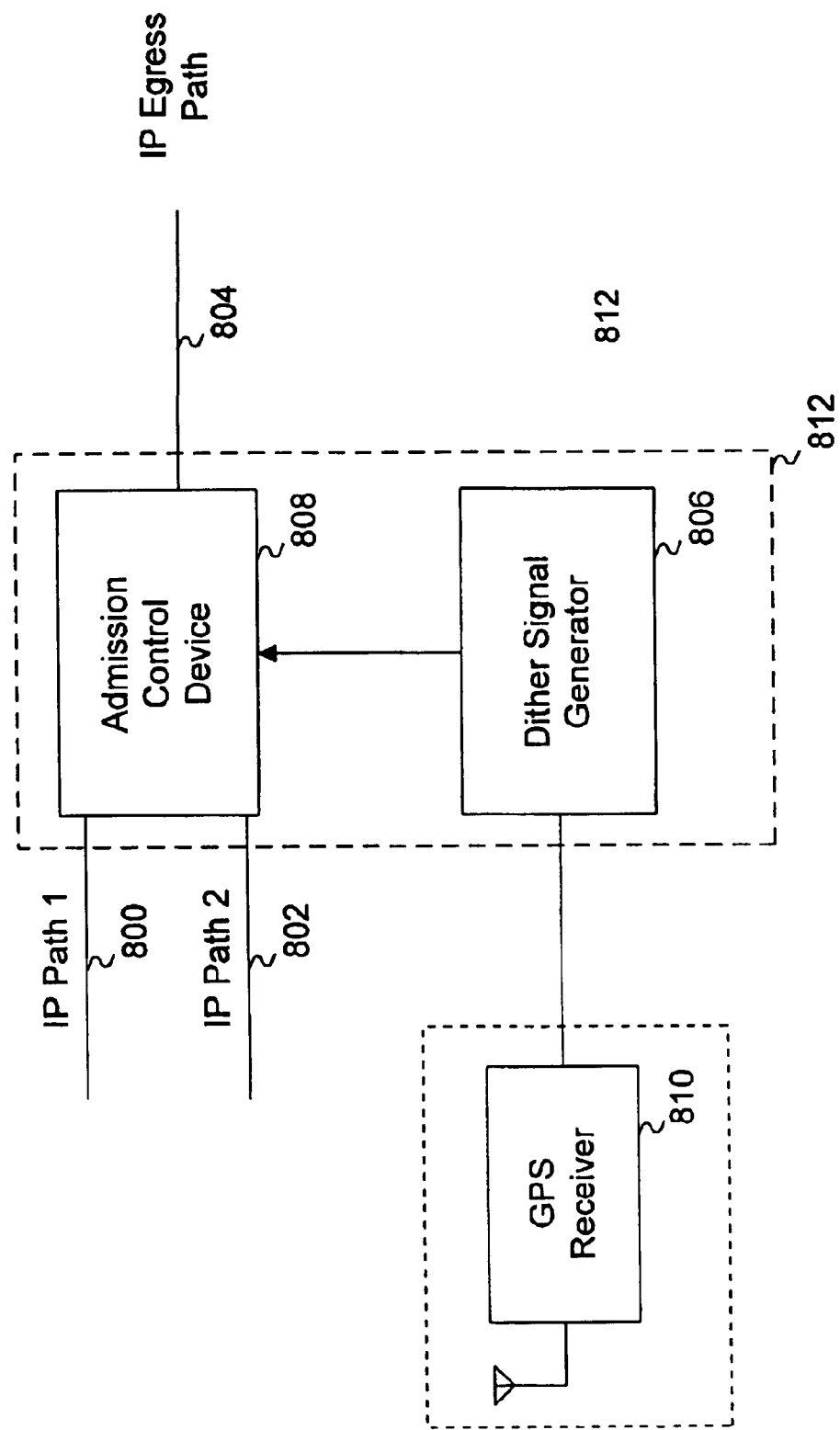
FIG. 8 is a schematic diagram of a router consistent with an exemplary embodiment of the present invention.
Figure 9:
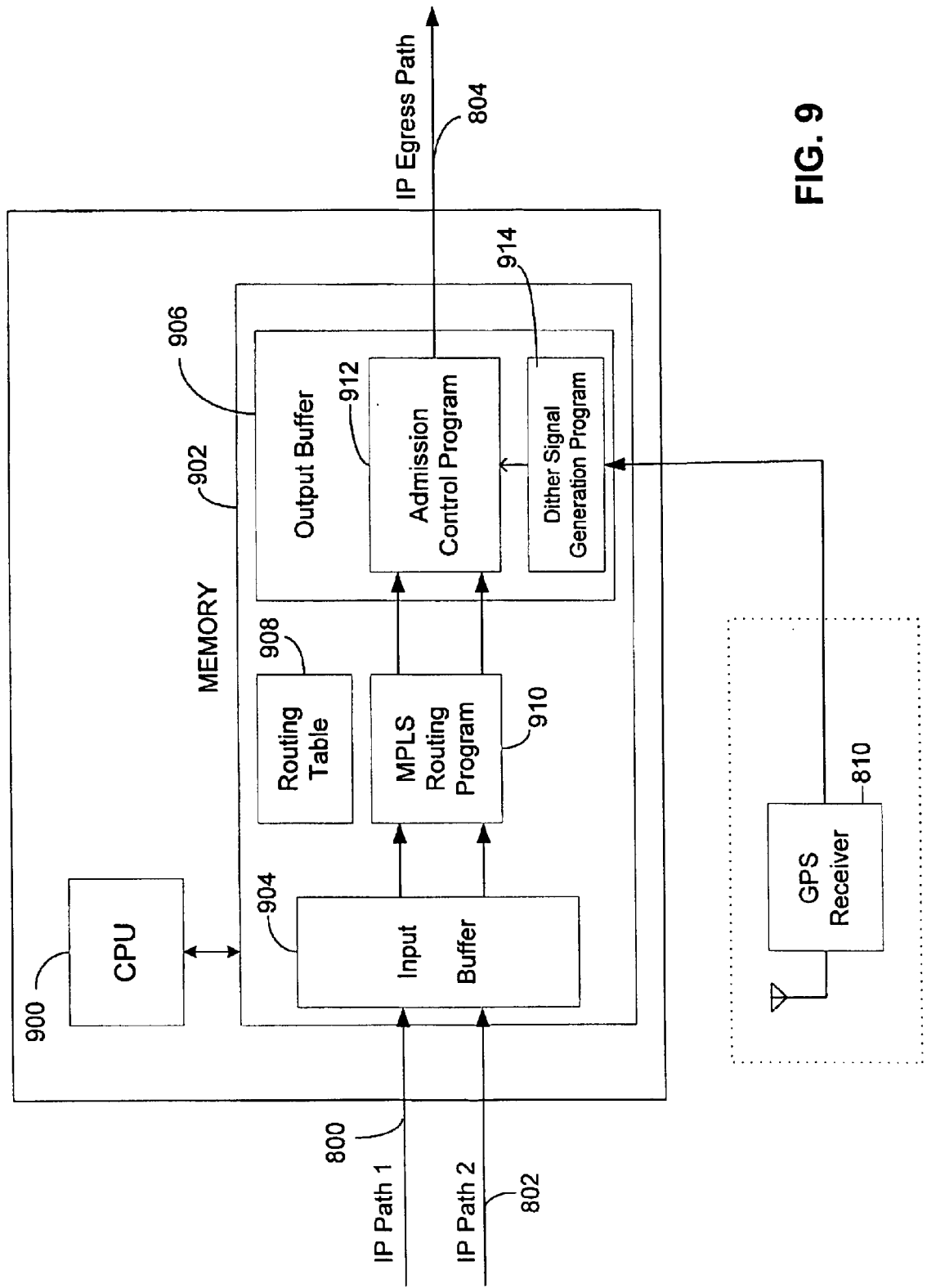
FIG. 9 is a block diagram illustrating an exemplary embodiment of the present invention which is implemented in software within a conventional router.

In summary, FIG. 1 is a graph of the peak to average load as a function of time in a prior art voice network. FIG. 2 graphically illustrates the standard IP flow and the IP flow with CBR services added in a prior art network. FIG. 3 is a block diagram of an optical network comprising routers A, B and C. FIG. 4 graphically illustrates the autocorrelation of voice traffic as a function of time. FIG. 5 illustrates the autocorrelation of the IP flow as a function of time. FIG. 6 graphically illustrates dither time as a function of time. FIG. 7 graphically illustrates two uncorrelated IP flows being transmitted over a single medium consistent with an exemplary embodiment of the present invention. FIG. 8 is a schematic diagram of a simplified portion of a router. Finally, FIG. 9 is a block diagram illustrating an exemplary embodiment of the present invention implemented within software of a conventional router.

FIG. 3 illustrates an exemplary optical network comprising a router A 300, router B 302 and router C 304. According to an embodiment of the present invention, a packet 306 sent from router A 300 travels to router B 302. When the packet 306 arrives at router B 302, it is desired that router B 302 be in the "open" position so that the packet 306 may be transmitted to router C 304 immediately. By allowing a router to be ready for a packet in the open position, flow rate can be increased, and latency may be reduced.

To accomplish the above task, a location positioning receiver (not shown) may be attached to or incorporated within each router. Examples of such a receiver include conventional Global Positioning System (GPS) receivers, Long Range Navigation (LORAN) receivers, Satellite Navigation (SATNAV) receivers, or any other receiver that receives signals and calculates the arrival time and positional coordinates. The receiver provides three-dimensional (3D) coordinates for the position of the router(or whatever device is routing data) and a fourth dimension of time. In this manner, the receiver functions as a global clock, providing synchronization for the system. Using the 3D positional coordinates provided by each receiver attached to each router, the distance between the routers can be determined. Because the speed of the packets in the optical fiber is known, i.e. the speed of light divided by the refractive index of glass, the time required for a packet 306 to travel from router A 300 to router B 302 can be obtained. The anticipated arrival time a packet is to arrive at router B may be determined by adding the travel time (determined above), to the initial time (the time the packet 306 left router A 300), which is provided by the receiver connected to router A 300.

Other methods may be used to determine the arrival time of a packet. For example, the arrival time may be determined by assigning a "base" node and calculating the arrival time at the other network nodes. The arrival time at the other nodes can be calculated using the propagation speed of the signal through the fiber and the distance between the base nodes and the other nodes. The distance between the nodes, i.e. the fiber length between the nodes, can be determined using any distance means, such as an Optical Time Domain Reflectometer (OTDR).

An Admission Control Program of the router determines when a packet is transmitted. Those skilled in the art will realize that the Admission Control Program as described in this application may be implemented as a software module in readable memory or may be a hardwired or custom-designed device in hardware, despite the use of the "program" label.

More specifically, a dither signal produced by the Admission Control Program selects which data group is being transmitted. The data groups are typically two IP flows entering the router or a single flow that is broken into two groups. The dither signal of the exemplary embodiment of the present invention is optimized to provide a maximum IP flow rate.

One way to determine the optimal dither rate (frequency) is to calculate the autocorrelation of the IP flow. The physical significance of the autocorrelation function is that it provides a means of describing the interdependence of two random variables obtained by observing a random process spaced apart in time. The more rapidly the random process changes with time, the more rapidly the autocorrelation will decrease from its maximum magnitude at time t=0. Those skilled in the art will appreciate that autocorrelation is determined by shifting a function in time and multiplying it by itself. A value of 1 for the autocorrelation indicates that the function is completely positively correlated with itself. Likewise, a value of −1 for the autocorrelation indicates that the function is negatively correlated with itself. A value of 0 signifies that the function is uncorrelated.

As described previously, traffic in voice is uncorrelated as the number of users increase. Thus, as shown in FIG. 4, the autocorrelation 400 of voice goes to 0 as a function of time. However, IP flow, as described earlier, has correlation in the end-to-end flows. FIG. 5 shows the autocorrelation 500 of the IP flow as a function of time. As shown in FIG. 5, the autocorrelation 500 does not go to zero as a function of time. Instead, the autocorrelation 500 of the IP flow appears to be wavelike, varying between ±1.

A preferred method for determining the optimal dither rate is to study the IP flow rate as a function of dither time. The results of varying dither rate as a function of time and measuring IP flow rate is shown in FIG. 6. As shown in the example of FIG. 6, a maximum flow rate of IP flow 600 occurs when dithering the transmission of data of a single IP flow between an open and closed transmission state. By selecting a dither time of 30 ms, the IP flow rate will be maximized.

The flow rate may be further improved by making use of idle time in the bandwidth during transmission. FIG. 7 shows an example of transmitting a first flow 700 and a second independent, i.e. uncorrelated, flow 750 over a single medium. As shown in FIG. 7, the uncorrelated flows 700 and 750 are offset in time relative to each other, typically by approximately 180° according to the periodic dither signal. The first flow 700 may be transmitted by a first router during a first time, in this case 0–50 ms. Transmission is then switched to the second flow 750 after the first flow falls off, i.e. after 50 ms. By transmitting the uncorrelated flows over the sane medium, with each flow or group of data transmitted at a dither rate which optimizes IP flow, optimal utilization of the bandwidth may be achieved.

FIG. 8 illustrates a simplified example of a router according to an embodiment of the present invention. The router may have multiple IP traffic ingress paths, such as IP path 1 800 and IP path 2 802, an IP traffic egress path 804, a dither signal generator 806 and an admission control device 808. Optionally, the router may be connected to or may contain a location positioning receiver, such as GPS receiver 810. The splitting of IP flows into IP ingress path 800 and 802 respectively (more generally referred to as data sources or data groups), may be done by randomly splitting the flows into two groups, alternating packets from a buffer queue, or splitting the data into groups based on odd/even IP source or destination addresses. As described previously, the GPS receiver provides the location of the router in 3D coordinates and a global time. The dither signal starts at an appropriate time based on the GPS signal and has a frequency that is selected to maximize the flow rate. Using the periodic dither signal, IP path 1 800 and IP path 2 802 are combined into one output path, IP egress path 804, as discussed in reference to FIG. 7.

FIG. 9 illustrates an implementation of an embodiment of the present invention in software of a conventional router. A few examples of conventional routers include Versalar 25000, Optera Packet Core, Juniper M160 and Cisco GSR 12000. As shown in FIG. 9, a conventional router may include multiple ingress paths, such as IP path 1 800 and IP path 2 802, a central processing unit (CPU) 900, a memory 902, and an IP egress path 804. Optionally, the router may be connected to or may contain a location positioning receiver, such as GPS receiver 810. While conventional routers typically include more components, those skilled in the art will appreciate that FIG. 9 has been simplified merely to avoid confusion.

In operation, data enters via IP path 1 801 or IP path 2 802 and enters the input buffer 904. The CPU 900 may process programs in the memory 902, such as Multi Protocol Level Switching (MPLS) signaling program 910, admission control program 912 and dither signal generation program 914, to process and transmit the data in the input buffer 904. Before transmitting the data, the router learns where the data is to be routed. The router may use a protocol such as Open Shortest Path First (OSPF). IP packets have a field in their header that contains the address to which the packet is to be routed. In one embodiment of the present invention, routing tables, such as routing table 908, may be used at each router to look up the IP header and decide where to forward that packet.

In a preferred embodiment of the present invention, MPLS signaling program 910 is used to simplify the routing process by encapsulating the IP packets with a short fixed-length label that acts as a shorthand representation of an IP packet's header. At the first IP device the data encounters in the network, the contents of the header are analyzed and an appropriate label with which to encapsulate the packet is chosen. At each subsequent node within the network, the MPLS label, and not the IP header, is used to make the forwarding decision for the packet.

MPLS signaling program 910 also allows prioritization of services. For example, program 910 may allow voice to take high priority to ignore the dither signal because it is not exhibit fractal behavior. After determining where the data will be sent it is forwarded to an output buffer 906.

In an embodiment of the present invention, the output buffer 906 includes an admission control program 912 and a dither signal generation program 914 to transmit the data over IP Egress Path 804, as described previously. Specifically, a dither signal may be produced by the dither signal generation program 914 at a frequency which maximizes the EP flow rate. IP path 1 800 and IP path 2 802, which are uncorrelated may be combined into a single IP egress path 804 by the admission control program 912 using the dither signal to regulate how fast and when the paths are alternately combined into the single output path.

In summary, an exemplary embodiment of the present invention includes an admission control program of a router in a transmission system. As previously mentioned, applicant has discovered that a router consistent with an embodiment of the present invention increases IP flow and reduces latency by providing a dither signal at a frequency where the fractal spectrum of the traffic flow shows a peak to cause the IP flow to organize into a periodic and deterministic pattern. The frequency of the dither signal is optimized to maximize IP flow rate. Multiple, independent input paths can be combined into a single output path using an admission control dither signal which regulates the frequency at which the paths are combined and when the paths are combined.

The foregoing description of an implementation of the invention has been presented for purposes of illustration and description. It is not exhaustive and does not limit the invention to the precise form disclosed. Modifications and variations are possible in light of the above teachings or may be acquired from the practicing of the invention. For example, the described implementation uses a GPS receiver to determine the distance a packet travels. However, any such distance measuring means may be used, such as a Time Domain Reflectometer (TDR). Further, the distance may even be manually measured. The scope of the invention is defined by the claims and their equivalents.

What is claimed is:

1. A method for transmitting data between a first router and a second router within a network, comprising the steps of:
    selecting a frequency for a dither signal that maximizes a flow rate of the network;
    switching between two sources of the data within the first router at the selected frequency to transmit the data to the second router from the first router;
    determining an arrival time that the data will arrive at the second router; and
    placing the second router in an open state before the arrival time.

2. The method of claim 1, wherein the selecting step further comprises:
    varying a dither time as a function of the flow rate; and
    determining the frequency that maximizes the flow rate as the selected frequency.

3. The method of claim 1, wherein the determining step further comprises:
    determining a distance between the first router and the second router;
    determining a time required for the data to travel between the first router and the second router; and
    determining an arrival time based on the time required.

4. The method of claim 1, wherein the arrival time is calculated using a location positioning receiver.

5. A method for transmitting data through a routing element of a network, comprising the steps of:
    generating a periodic dither signal to regulate the transmission of data through the routing element;
    alternatively transmitting from a first source of data and from a second source of data in response to the periodic dither signal; and
    placing a next routing element in an open state based upon an anticipated arrival time for the transmitted data from the first source.

6. The method of claim 5, wherein the first source of data and the second source of data have different input paths to the routing element.

7. The method of claim 5, wherein the first source of data and the second source of data comprise different groups of data that exhibit a low correlation characteristic to each other.

8. The method of claim 5, wherein the first source of data and the second source of data comprise different groups of data that are independent and uncorrelated to each other.

9. The method of claim 5, wherein the generating step further comprises generating the periodic signal at a pre-selected frequency.

10. The method of claim 9, wherein the pre-selected frequency is a frequency that maximizes flow rate.

11. The method of claim 5, wherein the anticipated arrival time is based on distance to the next routing element.

12. The method of claim 5, wherein the anticipated arrival time is based on travel time for data on communication link structure between the routing element and the next routing element.

13. A routing element for transmitting data within a network, comprising:
    a dither signal generator for generating a timing signal for alternating between a plurality of data sources at a frequency selected for maximizing a flow rate of data transmission from the routing element to a next routing element within the network;
    an admission control device responsive to the timing signal and for transmitting the data from the data sources; and
    a distance measuring device for determining a distance the data must travel to the next routing element within the network and an arrival time of the data at the next routing element based on the distance, the distance and the arrival time being provided to the dither signal generator for use when placing the next routing element in an open state based upon the arrival time of the data.

14. The routing element of claim 13, wherein the admission control device is capable of transmitting the data that further comprises a first packet from one of the data sources and a second, uncorrelated packet from another of the data sources, the second packet being transmitted over the same path as the first packet and being offset in time from the first packet.

15. The apparatus of claim 13, wherein the distance measuring device is a location positioning receiver.

16. The apparatus of claim 15, wherein the location positioning receiver is an global positioning system.

17. The apparatus of claim 13, wherein the plurality of data sources comprise different input paths to the routing element.

18. The apparatus of claim 13, wherein the plurality of data sources comprise different groups of data that exhibit a low correlation characteristic to each other.

19. The apparatus of claim 13, wherein the plurality of data sources comprise different groups of data that are independent and uncorrelated to each other.

20. The apparatus of claim 13, wherein the timing signal is periodic.

21. A computer-readable medium containing computer-executable instructions for transmitting data through a routing element within a network comprising the steps of:

generating a periodic dither signal to regulate the transmission of data through the routing element;

alternatively transmitting from a first source of data and from a second source of data in response to the periodic dither signal; and placing a next routing element in an open state based upon an anticipated arrival time for transmitted data from the first source.

22. The computer-readable medium of claim 21, wherein the first source of data and the second source of data have different input paths to the routing element.

23. The computer-readable medium of claim 21, wherein the first source of data and the second source of data comprise different groups of data that exhibit a low correlation characteristic to each other.

24. The computer-readable medium of claim 21, wherein the first source of data and the second source of data comprise different groups of data that are independent and uncorrelated to each other.

25. The computer-readable medium of claim 21, wherein the generating step further comprises generating the periodic signal at a pre-selected frequency.

26. The computer-readable medium of claim 25, wherein the pre-selected frequency is a frequency that maximizes flow rate.

27. The computer-readable medium of claim 21, wherein the anticipated arrival time is based on distance to the next routing element.

28. The computer-readable medium of claim 21, wherein the anticipated arrival time is based on travel time for data on communication link structure between the routing element and the next routing element.

* * * * *

UNITED STATES PATENT AND TRADEMARK OFFICE
CERTIFICATE OF CORRECTION

PATENT NO. : 6,865,151 B1
DATED : March 8, 2005
INVENTOR(S) : Ross Alexander Saunders It is certified that error appears in the above-identified patent and that said Letters Patent is hereby corrected as shown below:

Column 8,
Lines 55, 57, 59, 62 and 65, change "apparatus" to -- routing element --;
Line 58, change "an" to -- a --; and Column 9,
Line 1, change "apparatus" to -- routing element --.

Signed and Sealed this

Ninth Day of August, 2005

JON W. DUDAS
*Director of the United States Patent and Trademark Office*